United States Patent Office 3,316,220
Patented Apr. 25, 1967

3,316,220
CURING SYSTEM FOR POLYURETHANES COMPRISING 1,4-BUTANEDIOL DIGLYCIDYL ETHER AND 4,4'-METHYLENEBIS-(2-CHLOROANILINE)
Thomas Ramos, New York, N.Y., assignor to the United States of America as represented by the Secretary of the Navy
No Drawing. Filed Oct. 23, 1962, Ser. No. 232,626
3 Claims. (Cl. 260—77.5)

The invention described herein may be manufactured and used by or for the Government of the United States of America for governmental purposes without the payment of any royalties thereon or therefor.

This invention relates to the curing of urethane prepolymers, and particularly to the isocyanate-terminated urethane prepolymers.

In previous curing procedures for urethane prepolymers, the major disadvantages were in the mixing required to incorporate the curing agent in the prepolymer, which involved a temperature well above room temperatures, such as between 250 degrees to 258 degrees F., to which the liquid prepolymer was preheated. A solid aromatic diamine curing agent was then added to the preheated prepolymer, either as a powder or as a molten fluid. Such a molten fluid may be obtained by heating the solid aromatic diamine to a temperature ranging between 212 degrees to 221 degrees F. The solid or molten aromatic diamine curing agent is then added to and mixed with the preheated urethane prepolymer with stirring of the mixture. The compounded mix is then poured into a preheated mold and generally cured at about 285 degrees F. for about thirty minutes, and finally post cured for approximately four hours at about 212 degrees F.

Urethane prepolymers in liquid form may be prepared from the reaction of a long chain diol, such as a linear polyester or polyether, with a diisocyanate and a low molecular weight chain extender such as a glycol or diamine. The reaction product so obtained is called a prepolymer which is terminated in either NCO or OH groups, depending upon which reactant is present in excess.

An object of the invention is to provide an improved and simple method of curing liquid urethane prepolymers, which is capable of self-cure so that it may be performed at room temperatures, with which no preheating of the prepolymers is required, with which no reduction of the curing agent to a powder or to a molten condition is necessary, desired or advantageous, which may be performed with the materials at room temperatures, which may be easily performed with simple and inexpensive apparatus and by non-technical personnel, and which may have additives added to give selected results.

Another object of the invention is to provide a new, improved and less expensive cured urethane prepolymer.

Other objects and advantages will appear from the following description of some examples illustrating the practice of the invention and the novel features will be particularly pointed out in connection with the appended claims.

One example of a liquid, isocyanate-terminated, urethane prepolymer which may be cured at room temperature in this manner is available in the open market under the name "Adiprene L-100," which prepolymer is the reaction product of 2,4-tolylene diisocyanate and 1,4-butylene oxide polyglycol, having an isocyanate content in excess of from 4.0 to 4.3 percent by weight of isocyanate groups. This "Adiprene" is described, for example, in Development Products Report #10 of March 15, 1958 and in Report No. 13, dated October 1958, both published in printed form and distributed by said E. I. du Pont de Nemours Co.

In accordance with this invention, a liquid, isocyanate-terminated, prepolymer of urethane is mixed at about room temperature with a curing agent containing a glycidyl ether, such as 1,4-butanediol diglycidyl ether, and a solid, aromatic diamine curing agent such as 4,4'-methylene bis (2 chloroaniline), and then the mixture is allowed to stand at about room temperature for curing. The time of curing will depend upon the reactivity and amounts of the curing mixture, and the proportions of the components of the curing mixture. One source of such aromatic diamine curing agent is available in the open market under the tradename of "Moca," identified chemically as 4,4'-methylene bis (2-chloroaniline).

*Illustrative or typical Example I*

| Component | Function | Parts by Weight |
|---|---|---|
| "Adiprene L-100" | Urethane Prepolymer | 100 |
| Glycidyl ether and "Moca" | Curing mixture | 78 |

This glycidyl ether and "Moca" mixture was in the proportions of 1.7 part by weight of 1,4-butanediol diglycidle ether with 1 part by weight of 4,4'-methylene bis (2-chloroaniline).

The components are mixed in these parts by weight at about room temperature and allowed to stand without added heat until the urethane prepolymer is cured.

*Illustrative or typical Example II*

| Component | Function | Parts by Weight |
|---|---|---|
| Adiprene L-100 | Urethane Prepolymer | 100 |
| Glycidyl ether and "Moca" | Curing agent | 26 |

The glycidyl ether and "Moca" mixture was in the same proportions by weight as used for Example I. The components were mixed in the proportions recited, at about room temperature, and allowed to cure at about room temperature. The proportions of curing agent to prepolymer vary between about 20 to 84 parts by weight of curing mixture to 100 parts by weight of the prepolymer.

*Illustrative or typical Example III for curvative agent*

Component: Parts by weight
   1,4-butanediol diglycidyl ether _____ 1.7
   "Moca" _____ 0.75

*Example IV for curative agent*

Component: Parts by weight
   1,4-butanediol diglycidyl ether _____ 1.7
   "Moca" _____ 2.5

*Example V for curative agent*

Component: Parts by weight
   1,4-butanediol diglycidyl ether _____ 1.7
   "Moca" _____ 1.5

The proportions of the curative components vary from about 0.75 to about 2.5 parts by weight of the "Moca" for each 1.7 parts by weight of the ether.

Because of variations in the batch properties of the various chemical components, compounds or materials, as obtained commercially and used in connection with this invention, all of the values, examples, statements, proportions, conditions, ratios and physical properties given hereinabove, must be considered as typical, representative, and illustrative and not necessarily optimum. Changes in the production techniques for the chemical compounds, chemical components or materials used or involved with this invention will, over a period of time, have considerable or cumulative effect on the product, end item or system, and hence, periodic reevaluations may be advisable or desirable.

The foregoing are to illustrate that products, end items or systems according to my invention may or will vary somewhat in property characteristics, due to variations in the properties of various batches of commercially available chemical components, compounds, or materials used, over which I have no control, so that while any specific characterizing properties of the new product, end item or system as given in the specification are actually those obtained in illustrative, representative or typical examples, and that variations in the characterizing properties in the products, end items or systems made from different batches of materials, chemical components or compounds are unavoidable with presently commercially available materials, chemical components or compounds.

An important advantage of this invention is that the components may be mixed together while they are at room temperature and cured at room temperatures, so that the use of additional heat to the components before and after mixing is unnecessary, serves no useful purpose, and merely accelerates the rate of curing. For this reason, the use of such additional heat is considered broadly to be use of the essence of the invention and the equivalent of curing at room temperature.

It will be understood that various changes in the details, conditions and materials which have been herein described in order to explain the nature of the invention, may be made by those skilled in the art within the principle and scope of the invention, as expressed in the appended claims.

I claim:
1. A cured polyurethane formed by admixing:
   (1) 100 parts of an isocyanate terminated polyurethane prepolymer, with
   (2) about 20 to 84 parts of a mixture consisting essentially of:
      (a) 1.7 parts of 1,4-butanediol diglycidyl ether, and
      (b) about 0.75 to 2.6 parts of 4,4'-methylene-bis-(2-chloroaniline).
2. The cured polyurethane of claim 1, wherein the ratio of (1) to (2) is about 100 to 78.
3. The cured polyurethane of claim 2, wherein the ratio of (1) to (2) is about 100 to 26.

References Cited by the Examiner

UNITED STATES PATENTS

| | | | |
|---|---|---|---|
| 2,830,038 | 4/1958 | Pattison | 260—77.5 |
| 2,917,489 | 12/1959 | Gladding et al. | 260—77.5 |
| 3,036,996 | 5/1962 | Kogon | 260—77.5 |
| 3,188,302 | 6/1965 | Lorenz | 260—77.5 |
| 3,194,793 | 7/1965 | Kogon | 260—77.5 |
| 3,239,580 | 3/1966 | Pendleton et al. | 260—830 |
| 3,261,813 | 7/1966 | Ramos | 260—77.5 |

LEON J. BERCOVITZ, *Primary Examiner.*

F. McKELVEY, *Assistant Examiner.*